(12) United States Patent
Beakes et al.

(10) Patent No.: US 8,381,156 B1
(45) Date of Patent: Feb. 19, 2013

(54) 3D INTER-STRATUM CONNECTIVITY ROBUSTNESS

(75) Inventors: Michael P. Beakes, Yorktown Heights, NY (US); Shih-Hsien Lo, Mount Kisco, NY (US); Michael R. Scheuermann, Katonah, NY (US); Matthew R. Wordeman, Kula, HI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/217,381

(22) Filed: Aug. 25, 2011

(51) Int. Cl.
*G06F 17/50* (2006.01)

(52) U.S. Cl. ...................................................... 716/110
(58) Field of Classification Search .................. 716/100, 716/110
See application file for complete search history.

(56) References Cited

U.S. PATENT DOCUMENTS

| | | | |
|---|---|---|---|
| 4,868,712 A | 9/1989 | Woodman | |
| 5,200,631 A | 4/1993 | Austin et al. | |
| 5,280,184 A | 1/1994 | Jokerst et al. | |
| 5,655,290 A | 8/1997 | Moresco et al. | |
| 5,702,984 A | 12/1997 | Bertin et al. | |
| 6,141,245 A | 10/2000 | Bertin et al. | |
| 6,258,623 B1 | 7/2001 | Moden et al. | |
| 6,308,143 B1 * | 10/2001 | Segawa | 703/1 |
| 6,569,762 B2 | 5/2003 | Kong | |
| 6,982,869 B2 | 1/2006 | Larson | |
| 7,021,520 B2 | 4/2006 | Bowen | |
| 7,030,486 B1 | 4/2006 | Marshall | |
| 7,067,910 B2 | 6/2006 | Drost et al. | |
| 7,299,426 B2 * | 11/2007 | Bonges, III | 716/112 |
| 7,521,950 B2 | 4/2009 | Bernstein et al. | |
| 7,615,869 B2 | 11/2009 | Koo et al. | |
| 7,623,398 B2 | 11/2009 | Arai | |
| 7,701,251 B1 | 4/2010 | Rahman et al. | |
| 7,710,329 B2 | 5/2010 | Chiozzi | |
| 7,753,779 B2 | 7/2010 | Shayesteh | |
| 7,768,790 B2 | 8/2010 | Kuroda et al. | |
| 7,772,708 B2 | 8/2010 | Leddige et al. | |
| 7,830,692 B2 | 11/2010 | Chung et al. | |
| 7,863,960 B2 | 1/2011 | Wang et al. | |
| 8,060,843 B2 * | 11/2011 | Wang et al. | 716/55 |
| 8,185,859 B2 * | 5/2012 | Bonges, III | 716/126 |
| 2002/0089831 A1 | 7/2002 | Forthun | |

(Continued)

FOREIGN PATENT DOCUMENTS

FR 2946182 A1 12/2010

OTHER PUBLICATIONS

Badaroglu et al., "Clock-skew-optimization methodology for substrate-noise reduction with supply-current folding" ICCAD, vol. 25. No. 6, pp. 1146-1154, Jun. 2006.

(Continued)

*Primary Examiner* — Suchin Parihar
(74) *Attorney, Agent, or Firm* — Tutunjian & Bitetto, P.C.; Louis J. Percello (57) ABSTRACT

There is provided a method for verifying inter-stratum connectivity for two or more strata to be combined into a 3D chip stack. Each of the two or more strata has 3D elements including active 3D elements, mechanical 3D elements, and dummy 3D elements. The method includes performing a respective 2D layout versus schematic verification on each of the two or more strata with respect to at least the 3D elements to pre-ensure an absence of shorts between the 3D elements when the two or more strata are subsequently stacked into the 3D chip stack. The method further includes checking inter-stratum interconnectivity between each adjacent pair of strata in the 3D chip stack.

22 Claims, 9 Drawing Sheets

U.S. PATENT DOCUMENTS

| | | | |
|---|---|---|---|
| 2004/0177237 A1 | 9/2004 | Huppenthal et al. | |
| 2005/0058128 A1 | 3/2005 | Carson et al. | |
| 2006/0043598 A1 | 3/2006 | Kirby et al. | |
| 2006/0271900 A1* | 11/2006 | Bonges, III | 716/16 |
| 2007/0001379 A1 | 1/2007 | Oh | |
| 2007/0033562 A1 | 2/2007 | Correale et al. | |
| 2007/0047284 A1 | 3/2007 | Silvestri | |
| 2007/0132070 A1 | 6/2007 | Buot et al. | |
| 2007/0240084 A1* | 10/2007 | Bonges, III | 716/2 |
| 2007/0287224 A1 | 12/2007 | Alam et al. | |
| 2007/0290333 A1 | 12/2007 | Saini et al. | |
| 2008/0068039 A1 | 3/2008 | Bernstein et al. | |
| 2008/0204091 A1 | 8/2008 | Choo et al. | |
| 2009/0024789 A1 | 1/2009 | Rajan et al. | |
| 2009/0055789 A1 | 2/2009 | McIlrath | |
| 2009/0064058 A1 | 3/2009 | McIlrath | |
| 2009/0070549 A1 | 3/2009 | Solomon | |
| 2009/0070721 A1 | 3/2009 | Solomon | |
| 2009/0168860 A1 | 7/2009 | Magagni et al. | |
| 2009/0196312 A1 | 8/2009 | Kuroda | |
| 2009/0237970 A1 | 9/2009 | Chung | |
| 2009/0245445 A1 | 10/2009 | Saen et al. | |
| 2009/0319968 A1* | 12/2009 | Wang et al. | 716/5 |
| 2009/0323456 A1 | 12/2009 | Gomm | |
| 2010/0005437 A1 | 1/2010 | McIlrath | |
| 2010/0044846 A1 | 2/2010 | Ohmi et al. | |
| 2010/0059869 A1 | 3/2010 | Kaskoun et al. | |
| 2010/0332193 A1 | 12/2010 | Hu et al. | |
| 2011/0016446 A1 | 1/2011 | Krebd | |
| 2011/0032130 A1 | 2/2011 | Ludwig | |
| 2011/0121811 A1 | 5/2011 | Dennard et al. | |
| 2012/0036489 A1* | 2/2012 | Wang et al. | 716/112 |
| 2012/0129301 A1* | 5/2012 | Or-Bach et al. | 438/129 |
| 2012/0227025 A1* | 9/2012 | Bonges, III | 716/122 |
| 2012/0248595 A1* | 10/2012 | Or-Bach et al. | 257/706 |

OTHER PUBLICATIONS

Chan et al., "A Resonant Global Clock Distribution for the Cell Broadband Engine Processor" IEEE J. Solid State Circuits, vol. 44, No. 1, pp. 64-72, Jan. 2009.

Gutnik et al., "Active GHz Clock Network Using Distributed PLLs" IEEE JSSC, vol. 35, No. 11, pp. 1553-1560, Nov. 2000.

Lam et al., "Power supply noise suppression via clock skew scheduling," in Proceedings of International Symposium on Quality Electronic Design, pp. 355-360, Mar. 2002.

Miura et al., "A 2.7Gb/s/mm2 0.9pj/b/Chip 1Coil/Channel ThruChip Interface with Coupled-Resonator-Based CDR for NAND Flash Memory Stacking," ISSCC, pp. 490-491, Feb. 2011.

Pavlidis et al., "Clock distribution networks for 3-D integrated Circuits", IEEE CICC, pp. 651-654, Sep. 2008.

Restle et al., "A Clock Distribution Method for Microprocessors", IEEE JSSC, vol. 36, No. 5, pp. 792-799, May 2001.

Tam et al., "Clock Generation and distribution for the first IA-64 Microprocessor", IEEE JSSC vol. 35, No. 11, pp. 1545-1552, Nov. 2000.

* cited by examiner

| TABLE 1 |
|---|
| STEP 510 SUB-RULES, ANCILLARY RULES AND/OR IMPLEMENTATION DETAILS |
| In any stratum design hierarchy, overlapping of any two 3D elements on the same surface side is prohibited. This prohibition includes both active and mechanical 3D elements. The 3D element overlapping check can be realized based on cell bounding boxes or landing metal coordinates. |

FIG. 8

| TABLE 2 |
|---|
| STEP 520 SUB-RULES, ANCILLARY RULES AND/OR IMPLEMENTATION DETAILS |
| For terminals associated with C4 connections on the front side, only pins (1) at the landing metal layer (not generated by the design service process) before C4 connections are permitted, or (2) at the last metal layer (LM) or via contact in a 3D element. The restriction of no custom drawn metal shape between the pin layer and the C4 connections should be enforced. For terminals on the back side, the pins are created at (3) the landing metal layer if not generated (i.e., the landing metal layer is a design level), or (4) the last redistribution metal layer or via contact metal with the restriction of no custom drawn metal layer between the pin layer and the C4 connection. These two rules are used so that terminal pins are truly connected to the associated active 3D element once a chip passes a conventional LVS check. In cases (2) and (4), any metal design level above a pin layer can come solely from a reference design kit/library. The open or short error caused by any custom design is prevented.<br><br>Custom drawn non-routing shapes are not permitted at layers above (below) the 3D pin layer for the front (back) side. In the case where a 3D pin is at the last wiring metal layer or metal via contact, a custom drawn metal layer above (below) the pin layer on the front (back) side is flagged, preventing any error of shorting two different nets using any custom drawn non-wiring metal layer. |

FIG. 9

| TABLE 3 |
|---|
| STEP 530 SUB-RULES, ANCILLARY RULES AND/OR IMPLEMENTATION DETAILS |
| An inter-stratum interconnect pin must touch one and only one active 3D element (fully covered by the same metal layer) and vice versa. The pin and the landing metal pad must be center-to-center aligned. The preceding rule regarding alignment implies that no pin should touch any mechanical 3D element. These two rules are used to guarantee the one-to-one relationship between a 3D terminal pin and its associated active 3D element. Any faulty shorting or opening will not be induced by the appearance of mechanical 3D elements which may be required for structural integrity. |

FIG. 10

| TABLE 4 |
|---|
| STEP 540 SUB-RULES, ANCILLARY RULES AND/OR IMPLEMENTATION DETAILS |
| The design abstract has been widely used in design integration flow for less data volume. When the 3D connectivity checking is performed on an abstract cell view (primary or leaf), it is required that every 3D terminal pin should have a one-to-one correspondence in a layout view and in the corresponding abstract view in terms of name, layer, shape, coordinate, and net. |

FIG. 11

| TABLE 5 |
|---|
| STEP 710 SUB-RULES, ANCILLARY RULES AND/OR IMPLEMENTATION DETAILS |
| For every two adjacent strata connected using 3D elements, there must be a one-to-one correspondence between logically-connected active 3D elements and mechanical 3D elements on the mating sides of these strata. Any open terminated 3D pin in one stratum should not interact with any 3D pin in the adjacent stratum. An open terminated 3D pin has an open electrical end when the strata are stacked. The inter-connects for the mating sides of these strata would be defined in advance of each stratum's physical assembly. This interconnect would also be validated and compared with the full 3D system-level model before all strata (chips) are released to manufacturing. Inter-stratum interconnect verification would include checking for valid logical connections between adjacent strata based on physically aligned active 3D elements with matching net connectivity, valid physical connections between adjacent strata based on physically aligned mechanical 3D elements, checking for unconnected or misaligned 3D elements on either stratum, and checking for shorting connections between adjacent strata. While performing inter-stratum verification, the following checks can also be performed on each stratum: checking for redundant active and mechanical 3D elements; checking for overlapping active and mechanical 3D elements; and checking for shorting same-stratum active 3D elements. |

3D INTER-STRATUM CONNECTIVITY ROBUSTNESS

CROSS-REFERENCE TO RELATED APPLICATIONS

This application is related to the following commonly assigned applications, all concurrently filed herewith and incorporated herein by reference: Ser. No. 13/217,734, entitled "PROGRAMMING THE BEHAVIOR OF INDIVIDUAL CHIPS OR STRATA IN A 3D STACK OF INTEGRATED CIRCUITS"; Ser. No. 13/217,335, entitled "SYNCHRONIZING GLOBAL CLOCKS IN 3D STACKS OF INTEGRATED CIRCUITS BY SHORTING THE CLOCK NETWORK"; Ser. No. 13/217,349, entitled "3D CHIP STACK SKEW REDUCTION WITH RESONANT CLOCK AND INDUCTIVE COUPLING"; Ser. No. 13/217,767, entitled "3D INTEGRATED CIRCUIT STACK-WIDE SYNCHRONIZATION CIRCUIT"; Ser. No. 13/217,789 entitled "CONFIGURATION OF CONNECTIONS IN A 3D STACK OF INTEGRATED CIRCUITS"; Ser. No. 13/217,406, entitled "AC SUPPLY NOISE REDUCTION IN A 3D STACK WITH VOLTAGE SENSING AND CLOCK SHIFTING"; and Ser. No. 13/217,429, entitled "VERTICAL POWER BUDGETING AND SHIFTING FOR 3D INTEGRATION".

BACKGROUND

1. Technical Field

The present invention relates generally to integrated circuits and, in particular, to 3D inter-stratum connectivity robustness.

2. Description of the Related Art

A three-dimensional (3D) stacked chip includes two or more electronic integrated circuit chips (referred to as strata or stratum) stacked one on top of the other. The strata are connected to each other with inter-strata interconnects that could use C4 or other technology, and the strata could include through-silicon vias (TSVs) to connect from the front side to the back side of the strata. The strata could be stacked face-to-face or face-to-back where the active electronics can be on the "face" side of a particular stratum.

In conventional integrated circuit (IC) chip design, a layout versus schematic (LVS) apparatus and a set of methodology checking rules (e.g., design rule check (DRC)) are used to perform physical integrated circuit verification which paves a path for flawless integration and packaging. As is known, LVS is an electronic design automation (EDA) verification tool that determines whether a particular integrated circuit layout corresponds to the original schematic or circuit diagram of the design. In 3D stacked integrated circuit assemblies, however, there are scenarios where, even with each chip passing its own LVS and methodology checks, the interface signals, clocks or powers can be unintentionally shorted to each other or left unconnected (open) when all chips are assembled into a 3D stack. For example, two terminal pins of the same net from two face-to-face or face-to-back strata may not be electrically connected because they are not physically aligned to each other and 3D assemblies do not allow for intermediate wires to connect them. As a result, there is a demand to implement a 3D design methodology to extend IC verification beyond current single-chip LVS and methodology tool capabilities.

SUMMARY

According to an aspect of the present principles, there is provided a method for verifying inter-stratum connectivity for two or more strata to be combined into a 3D chip stack. Each of the two or more strata has 3D elements including active 3D elements, mechanical 3D elements, and dummy 3D elements. The method includes performing a respective 2D layout versus schematic verification on each of the two or more strata with respect to at least the 3D elements to pre-ensure an absence of shorts between the 3D elements when the two or more strata are subsequently stacked into the 3D chip stack. The method further includes checking inter-stratum interconnectivity between each adjacent pair of strata in the 3D chip stack.

According to another aspect of the present principles, there is provided a computer readable storage medium including a computer readable program. The computer readable program when executed on a computer causes the computer to verify inter-stratum connectivity for two or more strata to be combined into a 3D chip stack. Each of the two or more strata has 3D elements including active 3D elements, mechanical 3D elements, and dummy 3D elements. Inter-stratum connectivity for two or more strata to be combined into a 3D chip stack is verified by performing a respective 2D layout versus schematic verification on each of the two or more strata with respect to at least the 3D elements to pre-ensure an absence of shorts between the 3D elements when the two or more strata are subsequently stacked into the 3D chip stack, and checking inter-stratum interconnectivity between each adjacent pair of strata in the 3D chip stack.

According to yet another aspect of the present principles, there is provided an apparatus including at least a processor configured to verify inter-stratum connectivity for two or more strata to be combined into a 3D chip stack. Each of the two or more strata has 3D elements including active 3D elements, mechanical 3D elements, and dummy 3D elements. Inter-stratum connectivity for two or more strata to be combined into a 3D chip stack is verified by performing a respective 2D layout versus schematic verification on each of the two or more strata with respect to at least the 3D elements to pre-ensure an absence of shorts between the 3D elements when the two or more strata are subsequently stacked into the 3D chip stack, and checking inter-stratum interconnectivity between each adjacent pair of strata in the 3D chip stack.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 shows a TABLE 1 which includes one or more sub-rules, ancillary rules and/or implementation details corresponding to step 510 of FIG. 5, in accordance with an embodiment of the present principles;

FIG. 9 shows a TABLE 2 which includes one or more sub-rules, ancillary rules and/or implementation details corresponding to step 520 of FIG. 5, in accordance with an embodiment of the present principles;

DETAILED DESCRIPTION OF PREFERRED EMBODIMENTS

The present principles are directed to 3D inter-stratum connectivity robustness.

Advantageously, the present principles provide a novel design methodology to ensure that in 3D stacked integrated circuit (IC) technology, the circuits, macros, units, and chips are functionally connected between adjacent silicon layers (strata) using various 3D elements such as TSVs (through-silicon vias) and micro/mini C4 (a smaller version of the inter-chip C4s) connections (collectively referred to hereinafter as simply "C4 connections"). A set of design methodology rules is provided to achieve robust physical verification of 3D stacked IC interconnections insuring no signal or power terminals are shorting or unconnected within these 3D assemblies, i.e., the 3D layout versus the schematic is (LVS) clean. "LVS" clean refers to the situation where a particular integrated circuit layout corresponds to (i.e., matches) the original schematic or circuit diagram of the design. Usually, the matching is performed by comparing a layout net list to a schematic net list.

In an embodiment, the design methodology proposed herein can be considered to include two parts, although other reasonable partitions may also be construed. The first part applies to an intra-stratum design and the second part applies to the interface between two adjacent silicon strata. In both cases, one or more 3D elements are involved.

A 3D element is defined as a standard layout cell created for a 3D stacking connection purpose provided by a reference design kit/library through the design. The 3D element includes process-required levels to form an electrical interconnect or a non-electrical (i.e., mechanical-only) bonding between two strata. Hence, an active 3D element is defined as a 3D element having its C4 connection landing metal electrically connected to the design. In contrast, a mechanical 3D element does not have its C4 landing metal electrically connected to the design which, for instance, can be achieved by removing a connecting via design from the 3D element. A dummy 3D element is defined as a 3D element that is not electrically connected but is included for mechanical reasons. It is generally required to include unconnected C4s for mechanical stability and thermal reasons. A custom drawn layer means a layer created by a layout designer in a non-reference design cell, i.e., a layer that is not from a reference design kit/library. A design level is a drawn level existing in the design prior to any post design data processing.

The front-side of a stratum, also interchangeably referred to as the device side, is the side of the stratum having the active components mounted thereon. Conversely, the backside is the opposing side having an absence of such active components mounted thereon.

Figure 1:
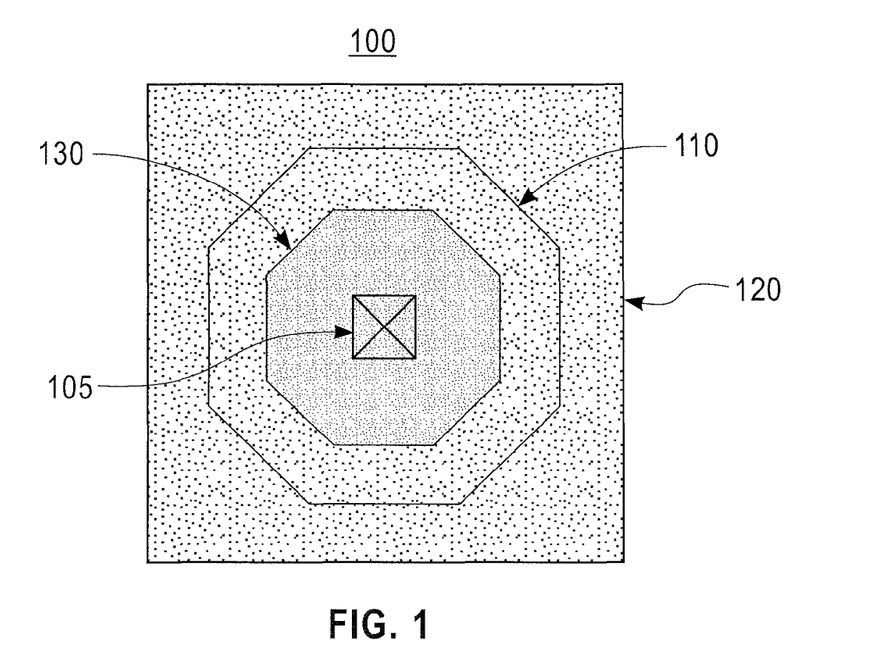
FIG. 1 shows the typical layout design 100 for front-side 3D elements to which the present principles may be applied, in accordance with an embodiment of the present principles.

FIG. 1 shows the typical layout design 100 for front-side 3D elements to which the present principles may be applied, in accordance with an embodiment of the present principles. The layout design 100 includes a 3D terminal pin 105, plated C4 terminal metal 110, an aluminum (Al) transfer pad 120, and a via 130 for connecting two metal layers (i.e., 110 and 120).

Figure 2:
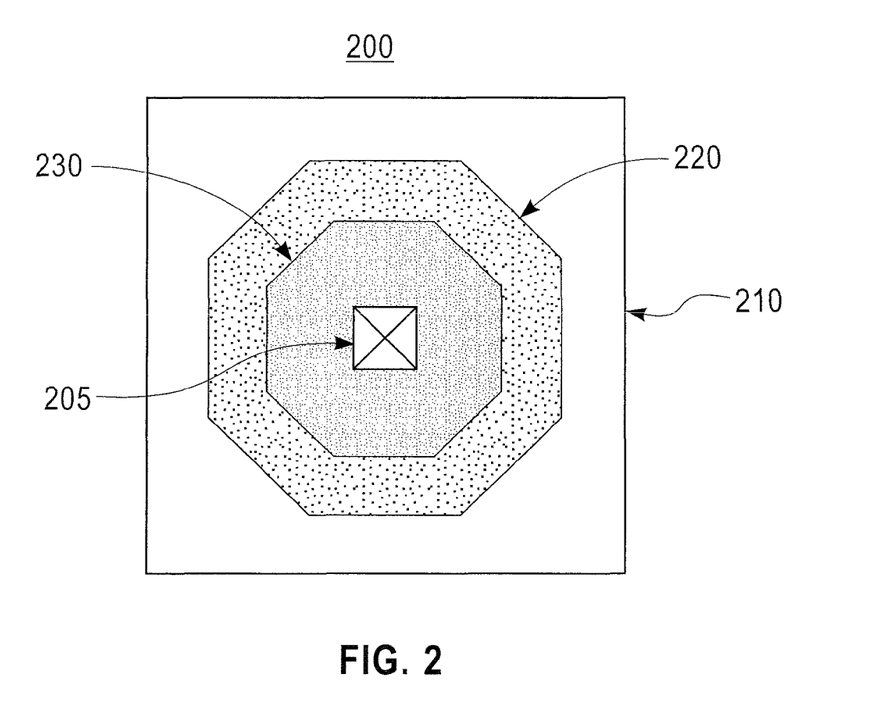
FIG. 2 shows the typical layout design 200 for backside 3D elements to which the present principles may be applied, in accordance with an embodiment of the present principles.

FIG. 2 shows the typical layout design 200 for backside 3D elements to which the present principles may be applied, in accordance with an embodiment of the present principles. The layout design 200 includes a 3D terminal pin 205, a redistribution metal layer (RDL) 210, a landing pad 220 for a C4 connection (not shown), and a via 230 for connecting two metal layers (which may or may not include the RDL 210). The RDL 210 makes the landing pad 220 available to other locations.

Figure 3:
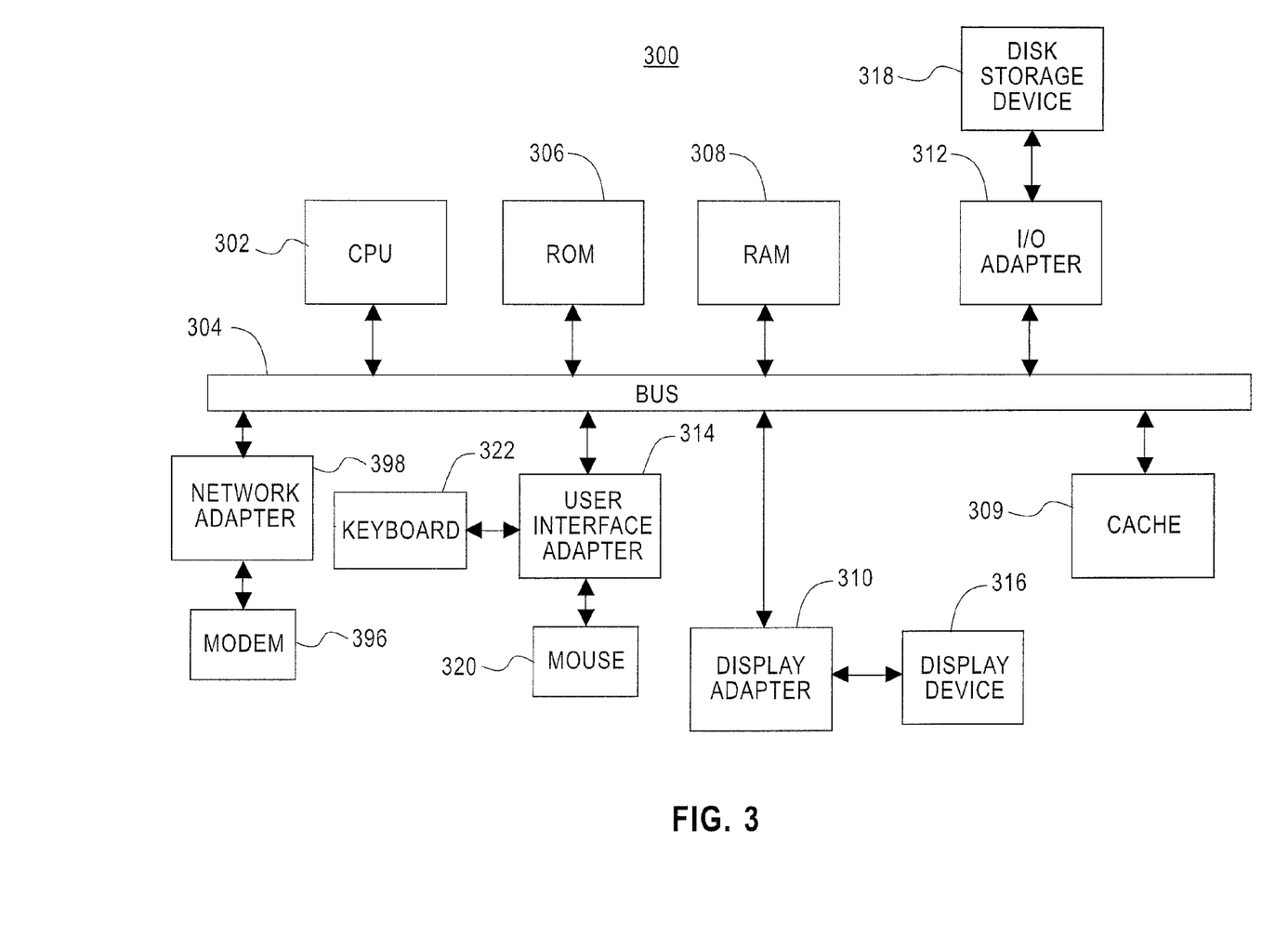
FIG. 3 is a block diagram showing an exemplary processing system 300 to which the present invention may be applied, in accordance with an embodiment of the present principles.

FIG. 3 is a block diagram showing an exemplary processing system 300 to which the present invention may be applied, in accordance with an embodiment of the present principles. The processing system 100 includes at least one processor (CPU) 302 operatively coupled to other components via a system bus 304. A read only memory (ROM) 306, a random access memory (RAM) 308, a display adapter 310, an I/O adapter 312, a user interface adapter 314, and a network adapter 398, are operatively coupled to the system bus 304.

A display device 316 is operatively coupled to system bus 104 by display adapter 310. A disk storage device (e.g., a magnetic or optical disk storage device) 318 is operatively coupled to system bus 304 by I/O adapter 312.

A mouse 320 and keyboard 322 are operatively coupled to system bus 304 by user interface adapter 314. The mouse 320 and keyboard 322 are used to input and output information to and from system 300.

A (digital and/or analog) modem 396 is operatively coupled to system bus 304 by network adapter 398.

Of course, the processing system 300 may also include other elements, as readily contemplated by one of skill in the art.

Figure 4:
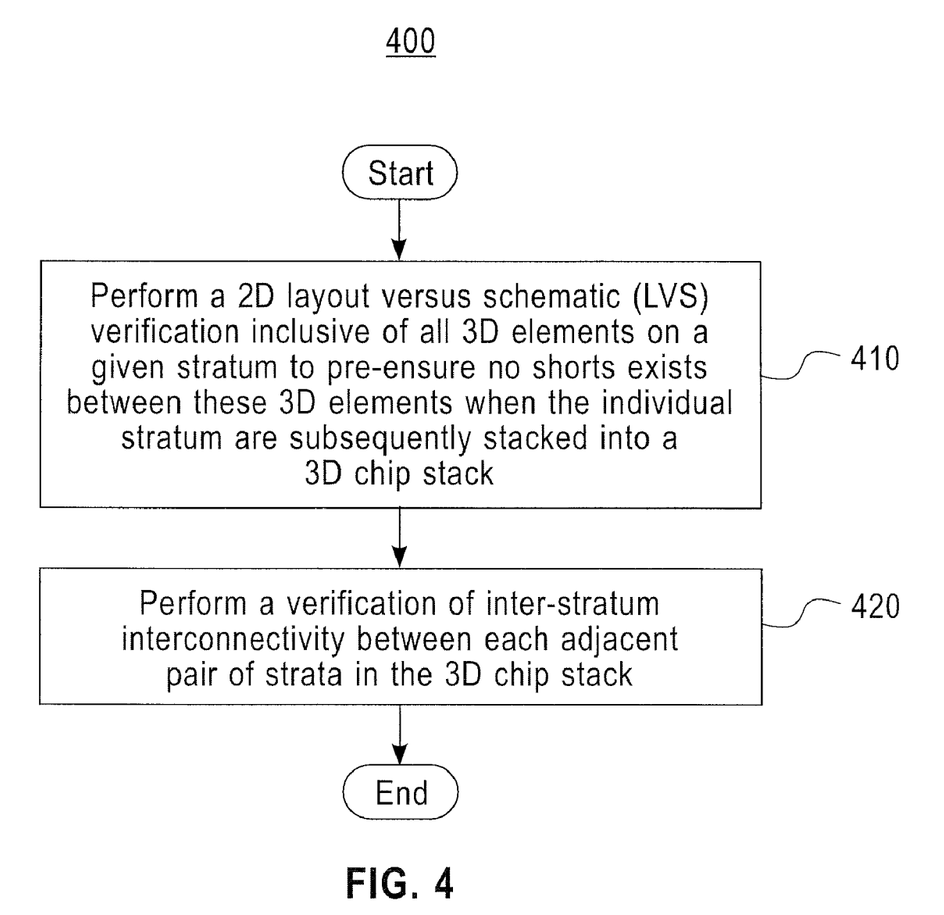
FIG. 4 shows a method 400 for providing 3D inter-stratum connectivity robustness for a 3D chip stack having two or more strata, in accordance with an embodiment of the present principles.

FIG. 4 shows a method 400 for providing 3D inter-stratum connectivity robustness for a 3D chip stack having two or more strata, in accordance with an embodiment of the present principles.

At step 410, a 2D layout versus schematic (LVS) verification is performed inclusive of all 3D elements (active and dummy elements) on a given stratum (including of C4 connections) to pre-ensure no shorts exists between these 3D elements when the individual stratum are subsequently stacked into the 3D chip stack.

At step 420, verification of inter-stratum interconnectivity between each adjacent pair of strata in the 3D chip stack is performed.

Figure 5:
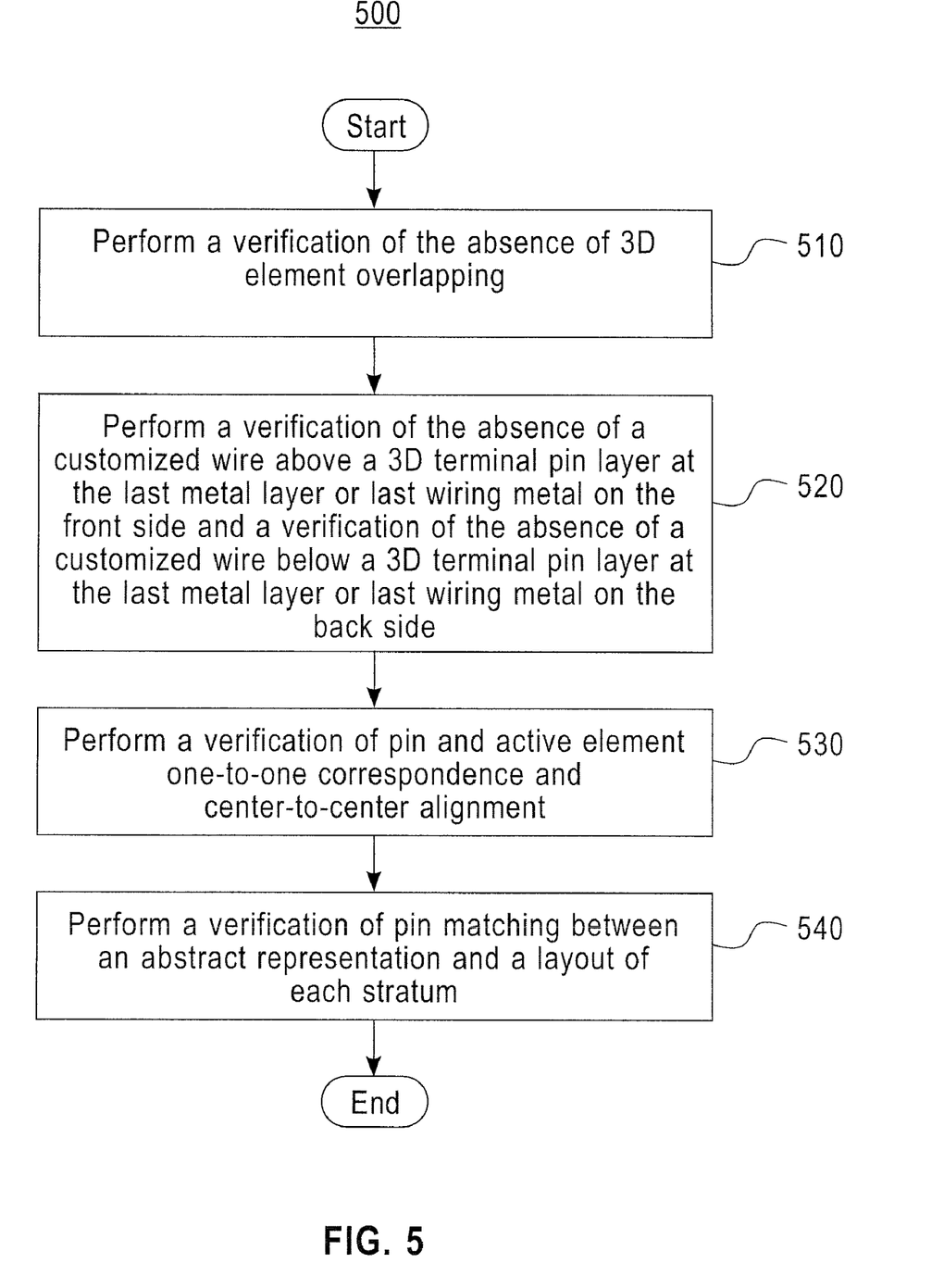
FIG. 5 further shows step 410 of FIG. 4, in accordance with an embodiment of the present principles.

FIG. 5 further shows step 410 of FIG. 4, in accordance with an embodiment of the present principles.

At step 510, verification of the absence of 3D element overlapping is performed.

Further regarding step 510, one or more of the following sub-rules, ancillary rules and/or implementation details can be applied, as depicted in TABLE 1 shown in FIG. 8. In any stratum design hierarchy, overlapping of any two 3D elements on the same surface side is prohibited. This prohibition includes both active and mechanical 3D elements. The 3D element overlapping check can be realized based on cell bounding boxes or landing metal coordinates.

At step 520, verification of the absence of a customized wire above a 3D terminal pin layer at the last metal layer or last wiring metal on the front side and verification of the absence of a customized wire below a 3D terminal pin layer at the last metal layer or last wiring metal on the back side is performed. As used herein, "last metal layer" is the last design metal/via level in the 3D element cell, and "last wiring metal" is the last design metal for electrical routing for signals or powers.

Further regarding step 520, one or more of the following sub-rules, ancillary rules and/or implementation details can be applied, as depicted in TABLE 2 shown in FIG. 9. For example, for terminals associated with C4 connections on the front side, only pins (1) at the landing metal layer (not generated by the design service process) before C4 connections are permitted, or (2) at the last metal layer (LM) or via contact in a 3D element. The restriction of no custom drawn metal shape between the pin layer and the C4 connections should be enforced. For terminals on the back side, the pins are created at (3) the landing metal layer if not generated (i.e., the landing metal layer is a design level), or (4) the last redistribution metal layer or via contact metal with the restriction of no custom drawn metal layer between the pin layer and the C4 connection. These two rules are used so that terminal pins are truly connected to the associated active 3D element once a chip passes a conventional LVS check. In cases (2) and (4), any metal design level above a pin layer can come solely from a reference design kit/library. The open or short error caused by any custom design is prevented.

Moreover, also regarding step 520, one or more of the following sub-rules, ancillary rules and/or implementation details can be applied. Custom drawn non-routing shapes are not permitted at layers above (below) the 3D pin layer for the front (back) side. In the case where a 3D pin is at the last wiring metal layer or metal via contact, a custom drawn metal layer above (below) the pin layer on the front (back) side is flagged, preventing any error of shorting two different nets using any custom drawn non-wiring metal layer.

At step 530, verification of pin and active element one-to-one correspondence and center-to-center alignment is performed.

Figure 10:
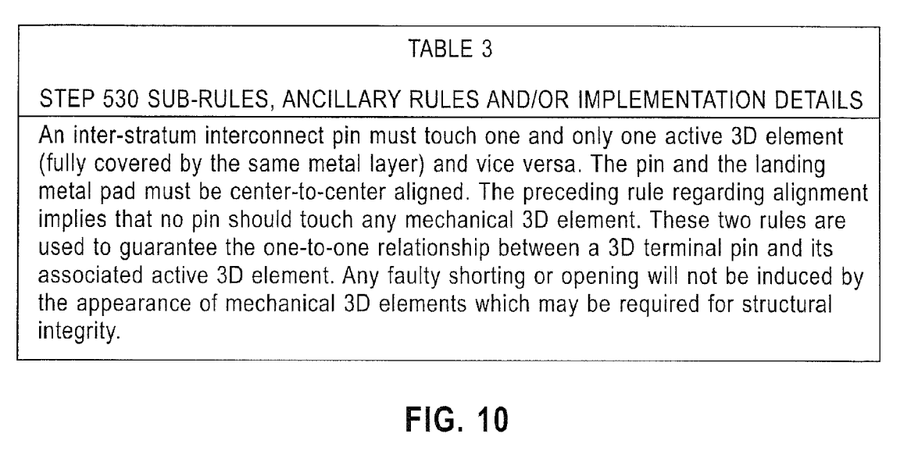
FIG. 10 shows a TABLE 3 which includes one or more sub-rules, ancillary rules and/or implementation details corresponding to step 530 of FIG. 5, in accordance with an embodiment of the present principles.

Further regarding step 530, one or more of the following sub-rules, ancillary rules and/or implementation details can be applied, as depicted in TABLE 3 shown in FIG. 10. An inter-stratum interconnect pin must touch one and only one active 3D element (fully covered by the same metal layer) and vice versa. The pin and the landing metal pad must be center-to-center aligned. The preceding rule regarding alignment implies that no pin should touch any mechanical 3D element. These two rules are used to guarantee the one-to-one relationship between a 3D terminal pin and its associated active 3D element. Any faulty shorting or opening will not be induced by the appearance of mechanical 3D elements which may be required for structural integrity.

At step 540, verification of pin matching between an abstract representation and a layout of each stratum is performed.

Figure 11:
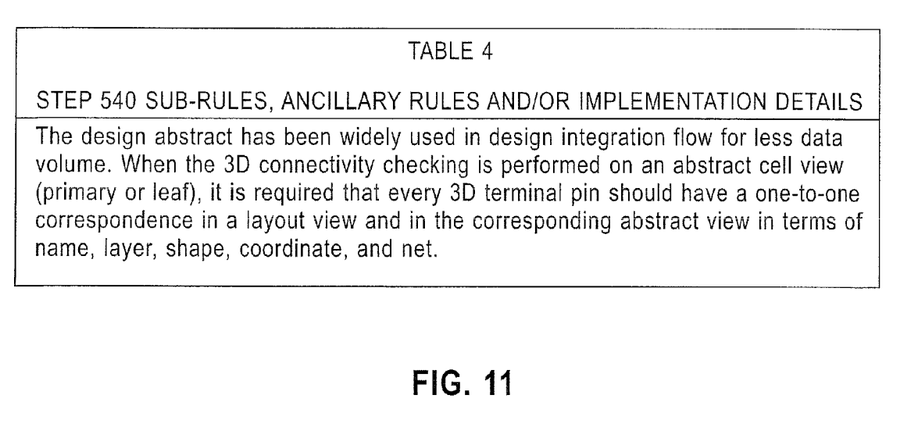
FIG. 11 shows a TABLE 4 which includes one or more sub-rules, ancillary rules and/or implementation details corresponding to step 540 of FIG. 5, in accordance with an embodiment of the present principles.

Further regarding step 540, one or more of the following sub-rules, ancillary rules and/or implementation details can be applied, as depicted in TABLE 4 shown in FIG. 11. The design abstract has been widely used in design integration flow for less data volume. When the 3D connectivity checking is performed on an abstract cell view (primary or leaf), it is required that every 3D terminal pin should have a one-to-one correspondence in a layout view and in the corresponding abstract view in terms of name, layer, shape, coordinate, and net.

Figure 6:
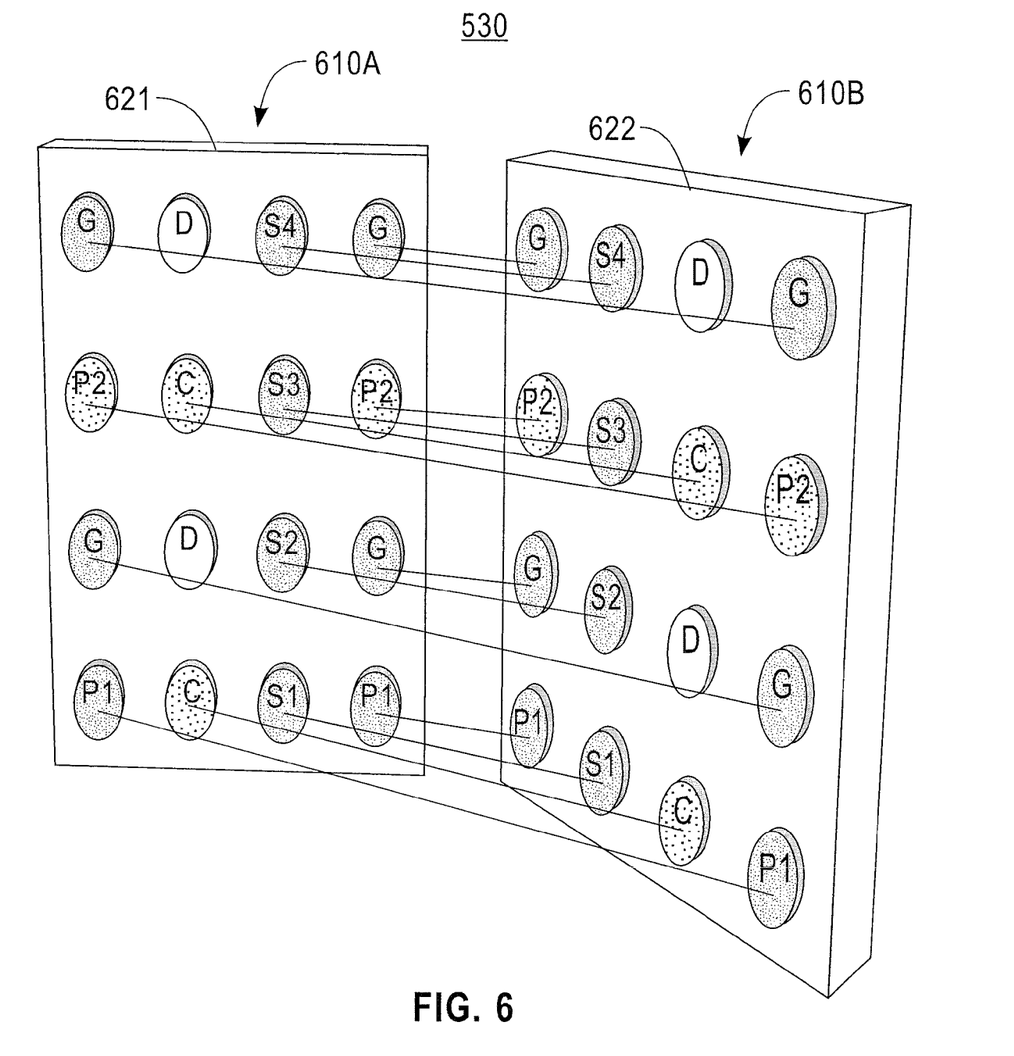
FIG. 6 graphically shows step 530 of FIG. 5, in accordance with an embodiment of the present principles.

FIG. 6 graphically shows step 530 of FIG. 5, in accordance with an embodiment of the present principles. Pins 610A and 610B on a first stratum 621 and a second stratum 622, respectively, which are ultimately to be interconnected for form a 3D chip stack, are checked for one-to-one correspondence and center-to-center alignment.

Figure 7:
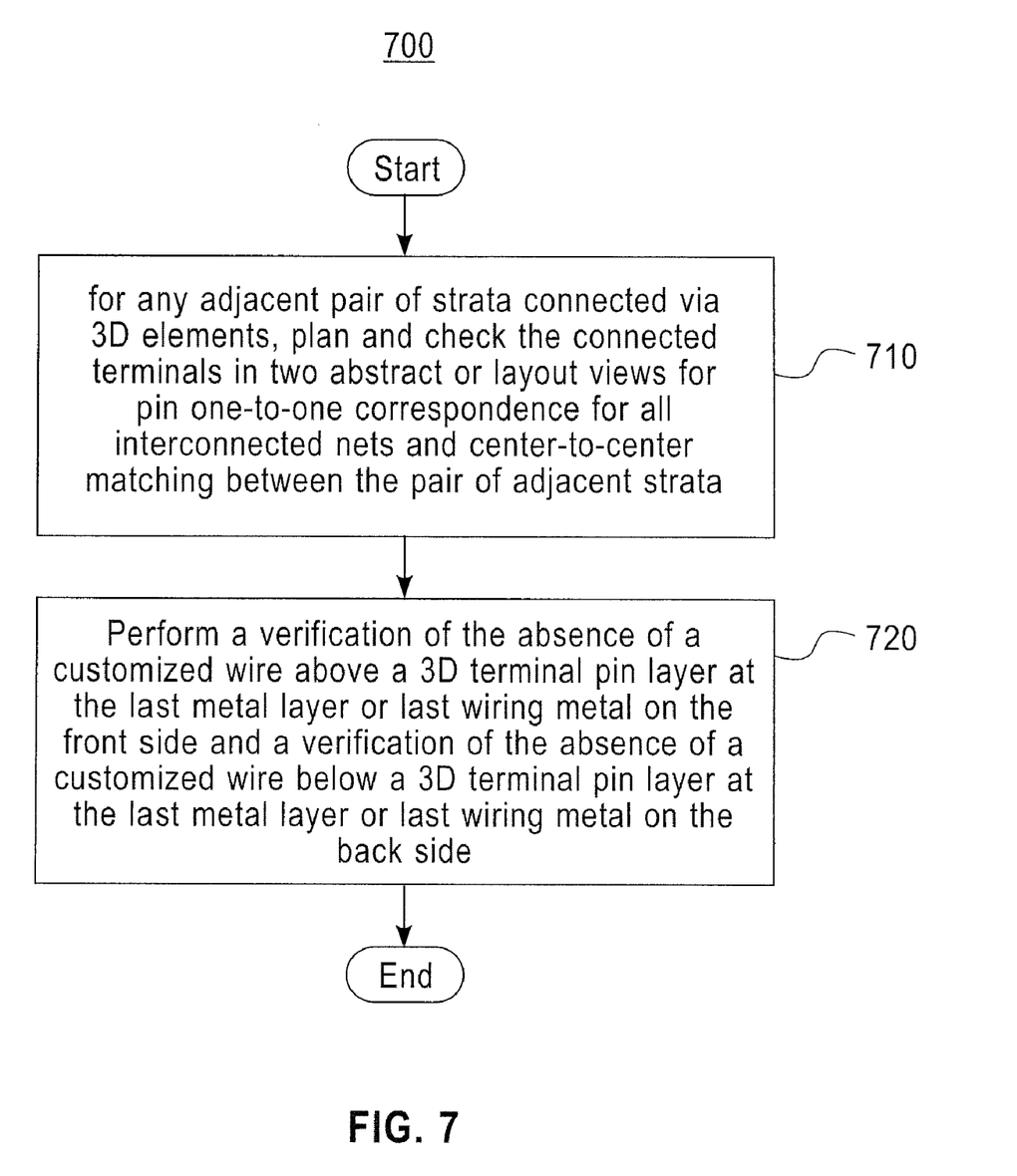
FIG. 7 further shows step 420 of FIG. 4, in accordance with an embodiment of the present principles.

FIG. 7 further shows step 420 of FIG. 4, in accordance with an embodiment of the present principles.

At step 710, for any adjacent pair of strata connected via 3D elements (chip-to-chip interconnects), the connected terminals in two abstract or layout views are planned and checked for pin one-to-one correspondence for all interconnected nets and center-to-center matching between the pair of adjacent strata.

Figure 12:
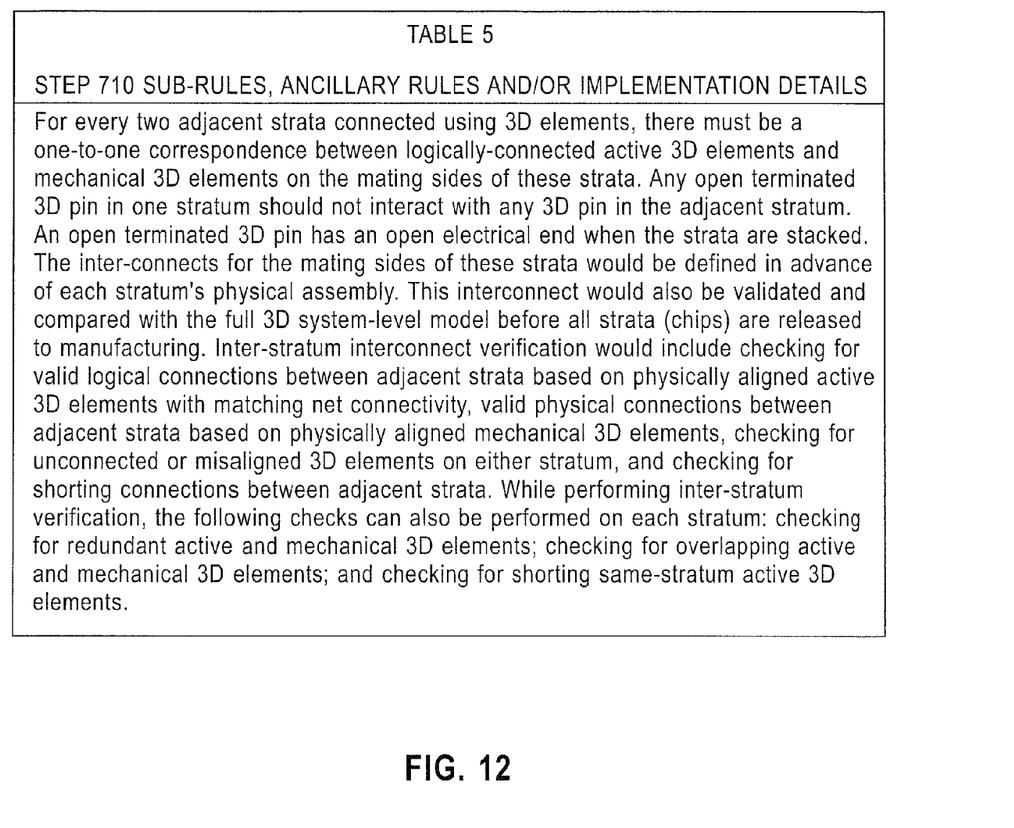
FIG. 12 shows a TABLE 5 which includes one or more sub-rules, ancillary rules and/or implementation details corresponding to step 710 of FIG. 5, in accordance with an embodiment of the present principles.

Further regarding step 710, one or more of the following sub-rules, ancillary rules and/or implementation details can be applied, as depicted in TABLE 5 shown in FIG. 12. For every two adjacent strata connected using 3D elements, there must be a one-to-one correspondence between logically-connected active 3D elements and mechanical 3D elements on the mating sides of these strata. Any open terminated 3D pin in one stratum should not interact with any 3D pin in the adjacent stratum. An open terminated 3D pin has an open electrical end when the strata are stacked. The inter-connects for the mating sides of these strata would be defined in advance of each stratum's physical assembly. This interconnect would also be validated and compared with the full 3D system-level model before all strata (chips) are released to manufacturing. Inter-stratum interconnect verification would include checking for valid logical connections between adjacent strata based on physically aligned active 3D elements with matching net connectivity, valid physical connections between adjacent strata based on physically aligned mechanical 3D elements, checking for unconnected or misaligned 3D elements on either stratum, and checking for shorting connections between adjacent strata. While performing inter-stratum verification, the following checks can also be performed on each stratum: checking for redundant active and mechanical 3D elements; checking for overlapping active and mechanical 3D elements; and checking for shorting same-stratum active 3D elements.

All primary C4 pins connected to package inputs/outputs should match the package pin file, and the pin coordinates of these primary C4 pins should match the physical map based on the package pin file.

Regarding the above described design rules, it is to be appreciated that such rules can be selectively employed depending on the application and available resources for implementing the same, as readily appreciated by one of ordinary skill in the art.

It is to be appreciated that existing conventional single-chip LVS and methodology tools can be modified and extended to support the additional layers and design restrictions necessary to validate each chip (stratum) in a 3D chip stack and the chip's 3D connectivity elements. It would be impractical to try to modify/extend existing single-chip tools to support whole stack interconnect verification since these tools cannot handle multiple designs with identical metal levels. It is also impractical to try to utilize existing IC packaging tools for 3D interconnect validations since these tools are predicated on conventional chip interconnect. Therefore, an independent tool is created to check that the 3D system-level model matches the physical 3D strata including logical (net list) interconnect verification and physical alignment of active and mechanical 3D elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It is to be further appreciated that while one or more embodiments described herein may refer to the use of Silicon with respect to a chip or a through via, the present principles are not limited to using only chips or vias made from Silicon and, thus, chips or vias made from other materials including but not limited to Germanium and Gallium Arsenide may also be used in accordance with the present principles while maintaining the spirit of the present principles. Moreover, it is to be further appreciated that while one or more embodiments described herein may refer to the use of C4 connections, the present principles are not limited to solely using C4 connections and, thus, other types of connections may also be used while maintaining the spirit of the present principles. The same applies for the through-Silicon vias described herein. Hence, examples of other chip-to-chip connections that may be used in stacked chips include micro-pillars, inductive coupling, and capacitive coupling.

It is to be understood that the present invention will be described in terms of a given illustrative architecture having a wafer; however, other architectures, structures, substrate materials and process features and steps may be varied within the scope of the present invention.

It will also be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip of photovoltaic device may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for verifying inter-stratum connectivity for two or more strata to be combined into a 3D chip stack, each of the two or more strata having 3D elements including active 3D elements, mechanical 3D elements, and dummy 3D elements, the method comprising:
    performing a respective 2D layout versus schematic verification on each of the two or more strata with respect to at least the 3D elements to pre-ensure an absence of shorts between the 3D elements when the two or more strata are subsequently stacked into the 3D chip stack; and
    checking inter-stratum interconnectivity between each adjacent pair of strata in the 3D chip stack,
    wherein said performing step comprises one or more of:
        verifying an absence of 3D element overlapping on a same stratum side;
        verifying an absence of a customized wire or shape above a 3D terminal pin layer at a last metal layer or a last wiring metal;
        verifying pin and active element one-to-one correspondence and center-to-center alignment; and
        verifying pin matching between an abstract representation and a layout of each of the two or more strata.

2. The method of claim 1, wherein said step of verifying an absence of 3D element overlapping on the same stratum side is performed using cell bounding boxes or landing metal coordinates.

3. The method of claim 1, wherein said step of verifying an absence of a customized wire or shape above a 3D terminal pin layer at a last metal layer or a last wiring metal comprises permitting, with respect to 3D terminal pins on the 3D terminal pin layer on a device mounting side of each of the two or more strata, only ones of the 3D terminal pins at a landing metal layer not generated by a design service process or at the last metal layer or at a via contact in a 3D element.

4. The method of claim 1, wherein said step of verifying an absence of a customized wire or shape above a 3D terminal pin layer at a last metal layer or a last wiring metal comprises restricting from use, with respect to an active device mounting side of each of the two or more strata, custom drawn metal shapes between the 3D terminal pin layer and any C4 connections.

5. The method of claim 1, wherein said step of verifying an absence of a customized wire or shape above a 3D terminal pin layer at a last metal layer or a last wiring metal comprises restricting from use, with respect to a non-active device mounting side of each of the two or more strata, custom drawn metal shapes between the 3D terminal pin layer and any C4 connections.

6. The method of claim 1, wherein said step of verifying pin and active element one-to-one correspondence and center-to-center alignment comprises verifying that an inter-stratum interconnect pin touches only one of the active 3D elements that is fully covered by a same metal layer.

7. The method of claim 1, wherein said step of verifying pin and active element one-to-one correspondence and center-to-center alignment comprises restricting an inter-stratum interconnect pin from touching any of the mechanical 3D elements.

8. The method of claim 1, wherein said performing step comprises restricting custom drawn non-routing shapes at layers above the 3D pin layer for an active device mounting side of each of the two or more strata.

9. The method of claim 1, wherein said performing step comprises restricting custom drawn non-routing shapes at layers below the 3D pin layer for a non-active device mounting side of each of the two or more strata.

10. The method of claim 1, wherein said step of verifying pin matching between an abstract representation and a layout of each of the two or more stratum comprises verifying that each 3D terminal pin on each of the two or more strata has a one-to-one correspondence between the abstract representation and the layout thereof with respect to name, layer, shape, coordinate, and net.

11. The method of claim 1, wherein said checking step comprises verifying, for each adjacent pair of strata, a one-to-one correspondence between logically-connected ones of the active 3D elements and the mechanical 3D elements on mating sides thereof.

12. The method of claim 1, wherein said checking step comprises ensuring an integrity of logical connections between each adjacent pair of strata based on physically aligned active 3D elements with matching net connectivity.

13. The method of claim 1, wherein said checking step comprises ensuring an integrity of physical connections between each adjacent pair of strata based on physically aligned ones of the mechanical 3D elements.

14. The method of claim 1, wherein said checking step comprises restricting an open terminated 3D pin in one stratum from touching any 3D terminal pin or any of the active 3D elements in an adjacent one of the two or more strata.

15. The method of claim 1, wherein said checking step comprises identifying unconnected or misaligned ones of the 3D elements on each adjacent pair of strata.

16. The method of claim 1, wherein said checking step comprises identifying shorting connections between each adjacent pair of strata.

17. The method of claim 1, further comprising identifying redundant ones of the active 3D elements and the mechanical 3D elements on each of the two or more strata.

18. The method of claim 1, further comprising identifying overlapping ones of the active 3D elements and the mechanical 3D elements on each of the two or more strata.

19. The method of claim 1, further comprising identifying shorting same-stratum active 3D elements.

20. A computer readable storage medium comprising a computer readable program stored thereon, wherein the computer readable program when executed on a computer causes the computer to perform the following:
    verify inter-stratum connectivity for two or more strata to be combined into a 3D chip stack, each of the two or more strata having 3D elements including active 3D elements, mechanical 3D elements, and dummy 3D elements,
    wherein verify inter-stratum connectivity for two or more strata to be combined into a 3D chip stack comprises:
        performing a respective 2D layout versus schematic verification on each of the two or more strata with respect to at least the 3D elements to pre-ensure an absence of shorts between the 3D elements when the two or more strata are subsequently stacked into the 3D chip stack; and
        checking inter-stratum interconnectivity between each adjacent pair of strata in the 3D chip stack, and
    wherein performing a respective 2D layout versus schematic verification comprises one or more of:
        verifying an absence of 3D element overlapping on a same stratum side;
        verifying an absence of a customized wire or shape above a 3D terminal pin layer at a last metal layer or a last wiring metal;
        verifying pin and active element one-to-one correspondence and center-to-center alignment; and
        verifying pin matching between an abstract representation and a layout of each of the two or more strata.

21. The method of claim 20, wherein said step of verifying an absence of 3D element overlapping on the same stratum side is performed using cell bounding boxes or landing metal coordinates.

22. An apparatus comprising at least a processor configured to perform the following:
    verify inter-stratum connectivity for two or more strata to be combined into a 3D chip stack, each of the two or more strata having 3D elements including active 3D elements, mechanical 3D elements, and dummy 3D elements,
    wherein verify inter-stratum connectivity for two or more strata to be combined into a 3D chip stack comprises:
        perform a respective 2D layout versus schematic verification on each of the two or more strata with respect to at least the 3D elements to pre-ensure an absence of shorts between the 3D elements when the two or more strata are subsequently stacked into the 3D chip stack; and
        check inter-stratum interconnectivity between each adjacent pair of strata in the 3D chip stack,
    wherein perform a respective 2D layout versus schematic verification comprises one or more of:
        verify an absence of 3D element overlapping on a same stratum side;
        verify an absence of a customized wire or shape above a 3D terminal pin layer at a last metal layer or a last wiring metal;
        verify pin and active element one-to-one correspondence and center-to-center alignment; and
        verify pin matching between an abstract representation and a layout of each of the two or more strata.

* * * * *